UNITED STATES PATENT OFFICE.

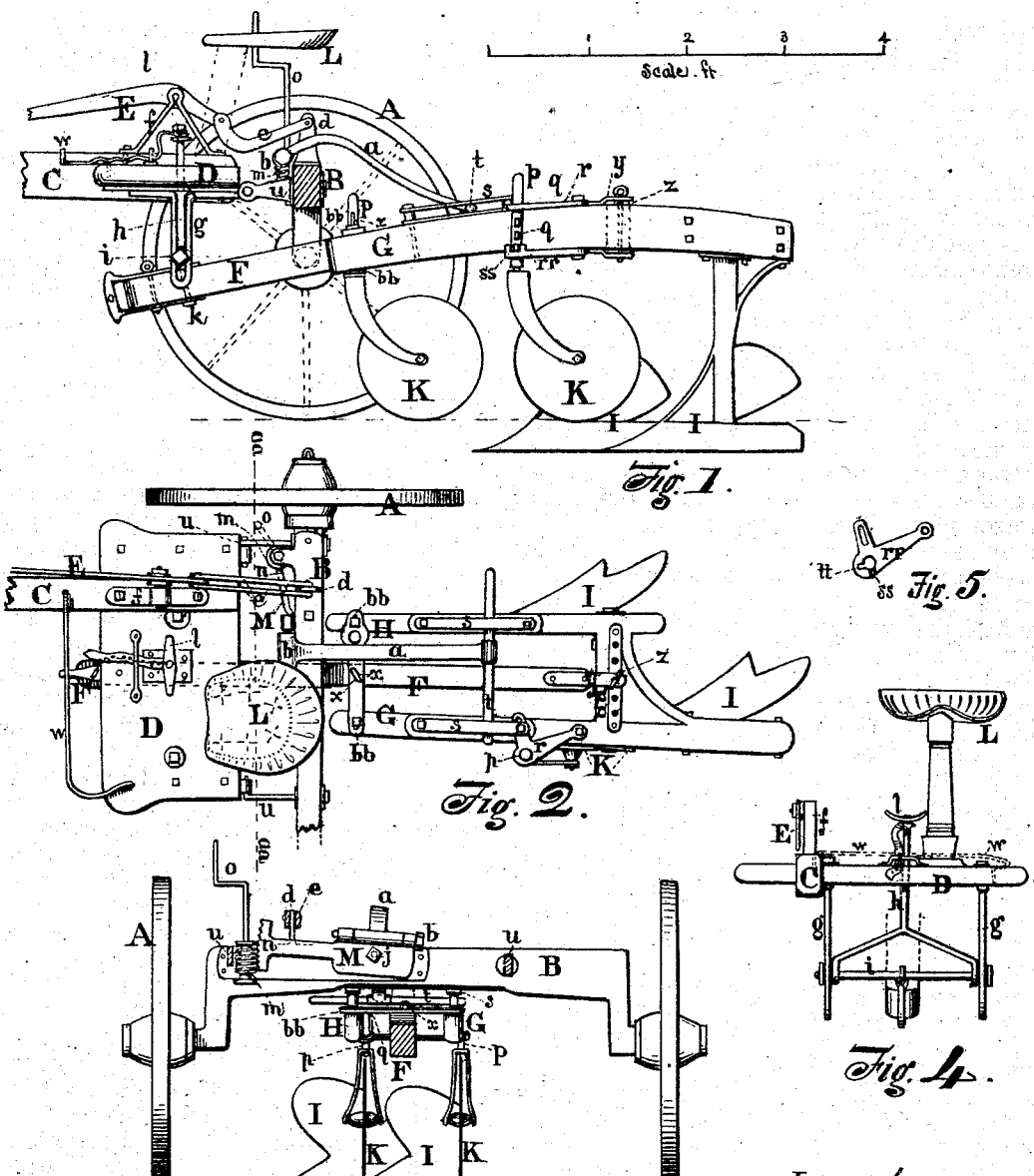

MARSHALL S. CURTISS, OF EARLVILLE, ILLINOIS.

IMPROVEMENT IN GANG-PLOWS.

Specification forming part of Letters Patent No. 158,253, dated December 29, 1874; application filed May 27, 1874.

*To all whom it may concern:*

Be it known that I, MARSHALL S. CURTISS, of Earlville, in the county of La Salle and in the State of Illinois, have invented an Improvement in Gang-Plows; and do hereby declare that the following is a full, clear, and exact description thereof, reference being had to the annexed drawings, making a part of this specification, in which like letters of reference refer to like parts, and in which—

Figure 1 represents a longitudinal elevation; Fig. 2, a superficial view; Fig. 3, an end view, taken from behind the platform and driver's seat along line *a a*, Fig. 2; Fig. 4, a view of platform from the front, showing locking-lever E, &c. Fig. 5 represents a plan view of the socket-plate of the colter.

The object of this invention is, first, to make an effective gang-plow, in which three or four horses may be used to pull abreast from the plow-beam; second, to provide a device for suspending and locking the plow-beams in or out of the ground without ratchets or detents to hold the lever, other than the peculiar conformation of the latter; third, to provide an effective device for regulating and working the toothed plate or device which "wings" or levels the plows when the wheels are passing along the side of a hill; fourth, to provide devices for the retention of rotary colters—at the same time to admit of their removal or reattachment to the beams, and adjustment at any depth in the soil. The first of these objects I accomplish by placing a third beam, for draft, between the usual parallel plow-beams, as G H, which I pivot at its middle to a cross-bar, *b b*, which unites the plow-beams G H, its rear being adjustably attached by a bolt or pin, Z, to the rear cross-bar *a a* of said beams, by means of several holes, in such a manner as to admit of swinging the heel of said draft-beam to the right or left to take more or less land, and in working three or four horses abreast in a plow, the advantage being that each horse pulls directly at the plow, is turned in less space, and more draft is obtained than where the horses are placed one before the other. The second of these objects I perform by the use of a bent lever, E, and bent link *e*, of peculiar shape and conjoint arrangement, so attached as to hold the beams and plows suspended from the soil by inclining the arched axle forward, the lever and link remaining locked without the agency of any detents. A reversing of the lever forward locks the plows in the soil by throwing the axle back again into its vertical or upright position. The third of the above objects I accomplish by the use of a vertical screw, *m*, and winch *o*, attached by bearings to the front of the axle B, the threads of which screw engage with the segmental toothed head *n* of the tilting-plate M, pivoted to the axle B, (a known device,) which extends to the slides *s s* of the beams G H by an arm, *a*, and cross-bar *t*—a known mechanism for leveling the plows on the side of a hill or incline. The fourth of the above objects I accomplish by providing the stems *p p* of each rotary colter K K with small lugs *q q*, &c., for retaining the same at the desired point, lower or higher, in plowing, within a recess or notch, *s s*, in a socket-plate, *r r*, attached to the plow-beam G.

In the drawings, A A are the wheels; B, the axle, of an arched form, to which the tongue C and platform D are jointly hinged at *u u*. These are also further connected by the lever E, and link *e*, and their pivotal standards *f d*—the one, *f*, on the platform, the second upon the top of the axle. Slotted vertical guides *g g* (known devices) depend from the platform, serving as detents for the ends of the cross-bar *i*, on which the head of the draft-bar F slides, and is lowered or elevated by the regulator *h*, manageable by the foot of the driver upon the rest *l*. A seat, L, rises from the platform D, and in front is a horizontal rod, *w*, extending from the tongue C to the opposite end of the platform for the driver's feet to rest upon. F represents the middle or oscillating draft-beam, to which no plow is attached. It is nearly twice the length of its companion beams on either side, and between which it is pivoted at its middle to the front cross-bar *b b*, which connects the fronts of the plow-beams. The heel of the said beam F is provided with a plate, *y*, pierced for a bolt, *z*, so as to be adjustably fastened or swung more to the right or left in one of the holes in the rear cross-brace *a a* of the beams G H, to admit, as before said, of taking more or less land, and also for adjustment of the draft of the machine to three or four horses. G H are the plow-beams, connected in front and rear by cross-braces $b\ b\ a\ a$, the front brace $b\ b$ acting at once as the pivot of beam F and the forward colter K, the rear brace acting as the adjusting-place for the heel of said beam F. Each beam G H carries a colter, K, and plow I, slides $s\ s$, for retention of the elevating-bar $t$ of the lever $a$. The beam G, in addition, carries plates or sockets $r\ r\ r$ for the stem of the rear colter, the lower one, $r\ r$, having a recess, $s\ s$, for retaining either of the lugs $q\ q$, &c., on the stem of said colter, and a hole, $t\ t$, on one side of the socket-hole, which admits the stem for the passage upward or downward of the lugs $q$ when it is desired to raise or lower the colter. These plates are retained one above and one below the beam by the same bolt, at one end, and in a similar manner by the bolt which retains the adjoining end of the slide $s$. The stem of the forward colter is retained by similar devices in the cross-bars $b\ b\ b\ b$. The vertical screw for the purpose of raising or lowering the plow winging or leveling plate M is attached in bearings to the front of the axle, so as to engage with the teeth of the said pivoted plate M.

What I claim as my invention is—

1. The adjustable draft-beam F, pivoted centrally to the cross-bar $b\ b$, attached to the head of the plow-beams G H, in combination with the cross-rod $i$, arranged in the slotted guides $g\ g$, and regulator $h$, constructed to operate substantially as set forth.

2. The rotary cutters K K, having their standards provided with the lugs $q$, in combination with the adjustable socket-plates $r$ and $r\ r$, pivoted to the beam G, plate $r\ r$ having a recess or depression, $s\ s$, constructed substantially as set forth.

3. The construction and arrangement of the beams G H, colter-sockets $r\ r\ r$, colters K K, with lugs $q$, cross-bars $b\ b\ b\ b$, carrying the forward colter, and to which the beam F is pivoted, cross-bar $a\ a$, pin $z$, and plate $y$, or heel of draft-beam F, substantially as described.

In testimony that I claim the foregoing improvement in gang-plows I have hereunto set my hand this 19th day of May, A. D. 1874.

MARSHALL S. CURTISS.

Witnesses:
 JAMES M. MORSE,
 MARION ANDERSON.